US009537659B2

(12) United States Patent
Yin

(10) Patent No.: US 9,537,659 B2
(45) Date of Patent: Jan. 3, 2017

(54) AUTHENTICATING A USER DEVICE TO ACCESS SERVICES BASED ON A DEVICE ID

(71) Applicant: Verizon Patent and Licensing Inc., Basking Ridge, NJ (US)

(72) Inventor: Fenglin Yin, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 371 days.

(21) Appl. No.: 14/015,072

(22) Filed: Aug. 30, 2013

(65) Prior Publication Data

US 2015/0067328 A1 Mar. 5, 2015

(51) Int. Cl.
*H04L 9/32* (2006.01)
*H04L 29/06* (2006.01)

(52) U.S. Cl.
CPC ......... *H04L 9/3236* (2013.01); *H04L 63/0807* (2013.01)

(58) Field of Classification Search
CPC .................................................... H04L 9/3236
See application file for complete search history.

(56) References Cited

U.S. PATENT DOCUMENTS

| 8,607,306 | B1* | 12/2013 | Bridge | H04L 63/068 |
| | | | | 726/1 |
| 2002/0169961 | A1* | 11/2002 | Giles | G06F 21/6218 |
| | | | | 713/175 |
| 2005/0060553 | A1* | 3/2005 | Allen | H04L 63/0869 |
| | | | | 713/182 |
| 2007/0094503 | A1* | 4/2007 | Ramakrishna | H04L 9/0822 |
| | | | | 713/172 |
| 2007/0154016 | A1* | 7/2007 | Nakhjiri | H04L 63/06 |
| | | | | 380/270 |
| 2010/0088752 | A1* | 4/2010 | Nagulakonda | H04L 9/3226 |
| | | | | 726/6 |

* cited by examiner

*Primary Examiner* — Saleh Najjar
*Assistant Examiner* — Simon Kanaan

(57) ABSTRACT

A first device may receive a first session token from a second device; determine that the first session token is expired or invalid; provide a security input to the second device to cause the second device to generate a first hash value of the security input using a key corresponding to a key identifier (ID); receive the key ID and the first hash value from the second device; generate a second hash value using the key corresponding to the key ID; determine that the first hash value matches the second hash value; and establish a session with the second device based on determining that the first hash value matches the second hash value.

20 Claims, 8 Drawing Sheets

| Session Identifier | Expiry timestamp | Previous receipt time | Idle expiry time period | Session key | Secure storage key | Secure storage value | PCN |
|---|---|---|---|---|---|---|---|
| 1234 | 1/1/01, 23:00:00 | 1/1/01, 15:15:00 | 15 mins | 89d810e8855ace68 2d1843d8cb128fe4 | 4915598f55e5d7a0 daca94fa1f0a63f7 | 0xfbdb1d1b18aa6c0 8324b7d64b71fb763 70690e1d | 487516 |
| 5678 | 1/1/01, 22:00:00 | 1/1/01, 16:30:00 | 60 mins | 89d810e8855ace68 2d1843d8cb128fe5 | 4915598f55e5d7a0 daca94fa1f0a63f8 | 0xfbdb1d1b18aa6c0 8324b7d64b71fb763 70690e1x | 487548 |
| 9012 | 1/1/01, 21:30:00 | 1/1/01, 14:15:00 | 30 mins | 89d810e8855ace68 2d1843d8cb128fe6 | 4915598f55e5d7a0 daca94fa1f0a63f9 | 0xfbdb1d1b18aa6c0 8324b7d64b71fb763 70690e1y | 487651 |

Fig. 5

| User Device ID | App ID | Key ID | Key | Expiry time period |
|---|---|---|---|---|
| UICC 123/IMPI 123 | A123 | Key ID 1 | Key 1 | 5 min |
| UICC 123/IMPI 123 | A456 | Key ID 2 | Key 2 | 6 min |
| UICC 123/IMPI 123 | A789 | Key ID 3 | Key 3 | 7 min |
| UICC 456/IMPI 456 | A123 | Key ID 4 | Key 4 | 5 min |
| UICC 456/IMPI 456 | A456 | Key ID 5 | Key 5 | 6 min |
| UICC 456/IMPI 456 | A789 | Key ID 6 | Key 6 | 7 min |

Fig. 6

AUTHENTICATING A USER DEVICE TO ACCESS SERVICES BASED ON A DEVICE ID

BACKGROUND

User devices can be used to access services (e.g., video/audio streaming services, or the like) based on providing a service provider with authentication information (e.g., login information, password information, etc.). Providing the authentication information can be an inconvenient process, thereby limiting the user's experience. Providing access without authentication information, or with authentication information that can be stolen (e.g., account numbers, or the like) can pose security risks and allow unauthorized users to access the services.

BRIEF DESCRIPTION OF THE DRAWINGS

FIG. 5 illustrates an example data structure that may be stored by one or more devices in the environment of FIG. 2;

FIG. 6 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may extend accessibility of a content delivery service (e.g., a service that may provide video content, audio content, or the like) to a user device (e.g., a device that may connect to a service provider network, such as a cellular network, to communicate with other client devices and/or other user devices).

In some implementations, the user device may access the content delivery service based on a universal integrated circuit card identifier (UICCID) and/or some other identifier of the user device without providing login information, thereby streamlining the user's experience when accessing the content delivery service. Further, the user device may access the content delivery service using a private key accessible only by the user device and a content delivery service provider, such that the content delivery service may not be accessed using the UICCID alone, thereby keeping the content delivery service secure from unauthorized users who may determine UICCIDs linked to the content delivery service.

Figure 1:
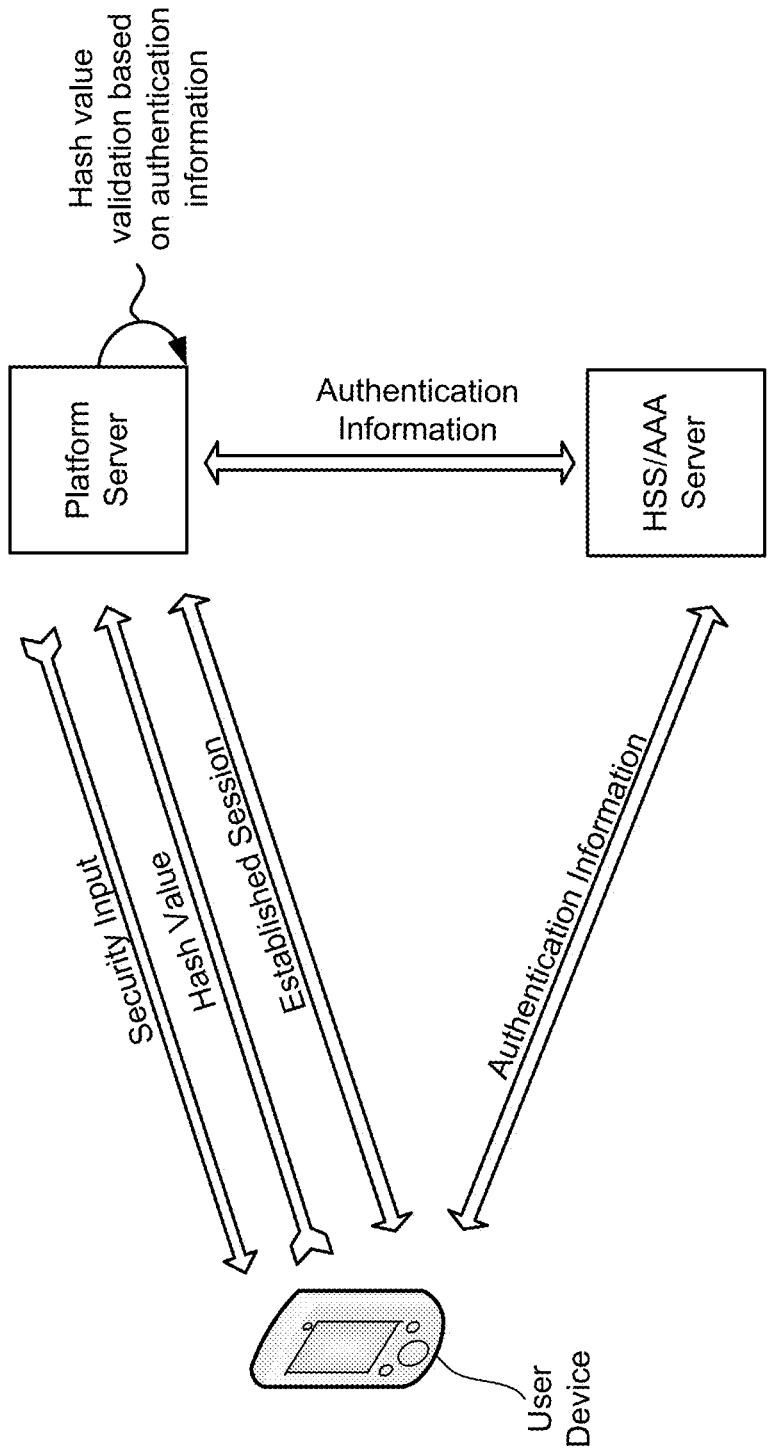
FIG. 1 illustrates an example overview of an implementation described herein.

FIG. 1 illustrates an example overview of an implementation described herein. In FIG. 1, assume that a user is subscribed to a content delivery service and that the content delivery service may be accessed via a platform server. Further, assume that a UICCID of a user device has been linked to the content delivery service. Further, assume that the user device requests to access the content delivery service via the platform server (e.g., to receive content, modify account information, modify subscription information, etc.). Given these assumptions, the platform server may provide the user device with a security input, such as a random number, a nonce value, a salt value, and/or some other value.

In some implementations, the user device may leverage a bootstrapping process, used to connect the user device to a service provider network (e.g., a cellular network), to receive authentication information from a bootstrapping server, such as a home subscriber server (HSS)/authentication, authorization, accounting (AAA) server. For example, the user device may receive information identifying a key (e.g., a key ID). In some implementations, the user device may select a particular key, stored by the user device, based on the key ID. In some implementations, the key may be used to generate a hash value of the security input provided by the platform server.

In some implementations, the platform server may receive the hash value from the user device, and may exchange authentication information with the HSS/AAA server. For example, the platform server may receive the key ID from the user device, provide the key ID to the HSS/AAA server, and may receive the key corresponding to the key ID from the HSS/AAA server. In some implementations, the platform server may generate a hash value of the security input using the key received from the HSS/AAA server.

In some implementations, the platform server may validate that the hash value, generated by the user device, matches the hash value generated by the platform server. Further, the platform server may store a list of UICCIDs that are associated with the content delivery service and may determine that the UICCID of the user device is associated with the content delivery service based on the list. In some implementations, the platform server may provide a session token, based on validating that the hash value, generated by the user device, matches the hash value generated by the platform server and based on determining that the UICCID of the user device is associated with the content delivery service. In some implementations, the user device may use the session token to request a session with the platform server to access the content delivery service. In some implementations, the platform server may establish a session with the user device based on receiving the session token. As a result, the user device may access a content delivery service without providing login information. Further, the content delivery service may remain secure from unauthorized users who may have knowledge of the UICCID of a user device that may be associated with a content delivery service subscription.

While systems and/or methods are described in terms of accessing a platform server to access a content delivery service, the systems and/or methods are not so limited. For example, the systems and/or methods may be used to access another type of server to access some other service, in addition to or excluding a content delivery service.

Figure 2:
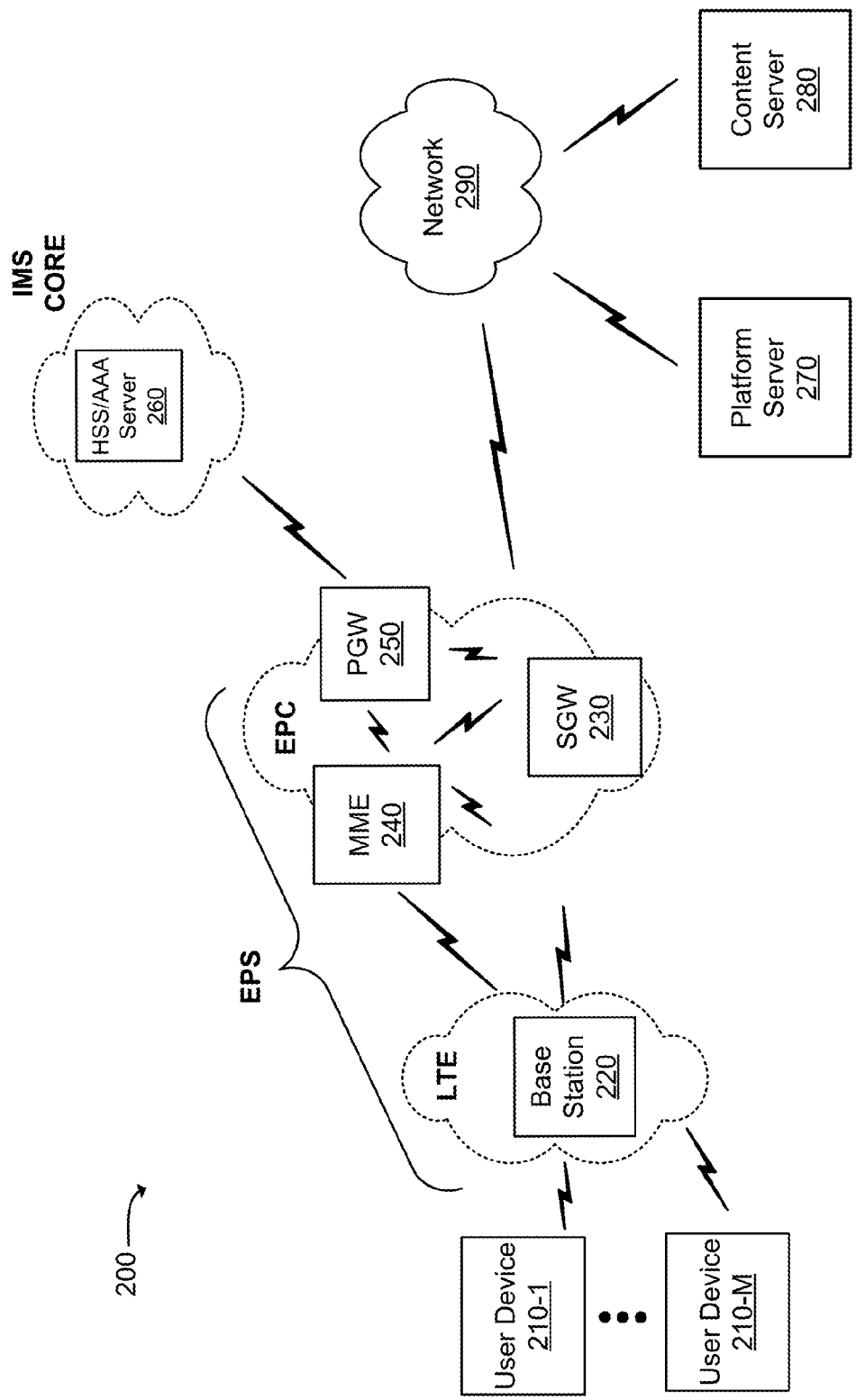
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, . . . , 210-M (where M≥1), a base station 220, a serving gateway 230 (referred to as "SGW 230"), a mobility management entity device 240 (referred to as "MME 240"), a packet data network (PDN) gateway (PGW) 250 (referred to as "PGW 250"), a home subscriber server (HSS)/authentication, authorization, accounting (AAA) server 260 (referred to as an "HSS/AAA server 260"), a platform server 270, a content server 280, and a network 290.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 and may enable user device 210 to communicate with network 290 and/or an Internet protocol (IP) multimedia subsystem (IMS) core. The IMS core may include HSS/AAA server 260 and may manage authentication, connection initiation, account information, a user profile, etc. associated with user device 210. As shown in FIG. 2, the LTE network may include base station 220, and the EPC may include SGW 230, MME 240, and/or PGW 250.

User device 210 may include a computation or communication device, such as a wireless mobile communication device that is capable of communicating with a cellular network via base station 220. In some implementations, user device 210 may communicate with another network (e.g., network 290) via base station 220. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a personal gaming system, a desktop computer, or another type of computation or communication device. In some implementations, user device 210 may include a communication interface, having a UICCID and/or some other identifier, used to connect to base station 220. User device 210 may send data to and/or receive data from network 290.

In some implementations, a content delivery service account may be linked to an account of user device 210. For example, a user of user device 210 may access a web portal to add the content delivery service account to the account of user device 210. In some implementations, user device 210 may access platform server 270 (e.g., to access a content delivery service) based on the UICCID and based on a hash value of a security input generated using a shared key stored by user device 210 and accessible to platform server 270 (e.g., a key stored by HSS/AAA server 260 that may be received by platform server 270). In some implementations, user device 210 may access the content delivery service via platform server 270 without user device 210 needing to provide login information.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 290 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 290 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

HSS/AAA server 260 may include one or more computing devices, such as a server device or a collection of server devices. In some implementations, HSS/AAA server 260 may manage, update, and/or store, in a memory associated with HSS/AAA server 260, profile information associated with user device 210 that identifies applications and/or services that are permitted for and/or accessible by user device 210 (e.g., content delivery services that user device 210 may access based on a UICCID of user device 210), billing information for access to the services, bandwidth or data rate thresholds associated with the applications or services, information associated with a user of user device 210 (e.g., a username, a password, a personal identification number (PIN), etc.), rate information, telephone call minutes allowed, and/or other information. Additionally, or alternatively, HSS/AAA server 260 may include a device that performs authentication, authorization, and/or accounting (AAA) operations associated with a communication connection with user device 210 (e.g., in connection with a bootstrapping process to authorize user device 210 to connect to base station 220). For example, HSS/AAA server 260 may include a bootstrapping server that may store a list of IP Multimedia Private Identity (IMPI) numbers corresponding to UICCIDs. In some implementations, HSS/AAA server 260 may authorize user device 210 to access the IMS core (e.g., to access content delivery services) based on the IMPI of user device 210.

In some implementations, HSS/AAA server 260 may store a key shared with user device 210. For example, the shared key may be stored by a UICC of user device 210 and by HSS/AAA server 260. In some implementations, the shared key may be used to generate a hash value of a security input provided by platform server 270. In some implementations, HSS/AAA server 260 may authorize platform server 270 to receive the shared key to allow platform server 270 to generate a hash value using the shared key.

Platform server 270 may include one or more computing devices, such as a server device or a collection of server devices. In some implementations, platform server 270 may provide access to a content delivery service. Additionally, or alternatively, platform server 270 may store content delivery service account information for a user, a UICCID for a user device 210 that may access the content delivery service, login information that may be used to access the content delivery service, subscription information, billing information, usage information, content delivery history information, and/or some other information regarding a content delivery service account. In some implementations, platform server 270 may provide access to content server 280 to allow user device 210 to receive content from content server 280.

In some implementations, platform server 270 may provide a session token to user device 210 and may establish a session to provide access to the content delivery service based on receiving and validating the session token (e.g., validating the session token is unexpired and that the session token is authentic). Additional details regarding the issuance and validation of session tokens are described below with respect to FIG. 4.

Content server 280 may include one or more computing devices, such as a server device or a collection of server devices. In some implementations, content server 280 may store content (e.g., audio content, video content, documents, images, or the like) and may provide the content to user device 210 and/or client device 215. In some implementations, content server 280 may be accessible via a session between user device 210 and platform server 270.

Network 290 may include one or more wired and/or wireless networks. For example, network 290 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 290 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
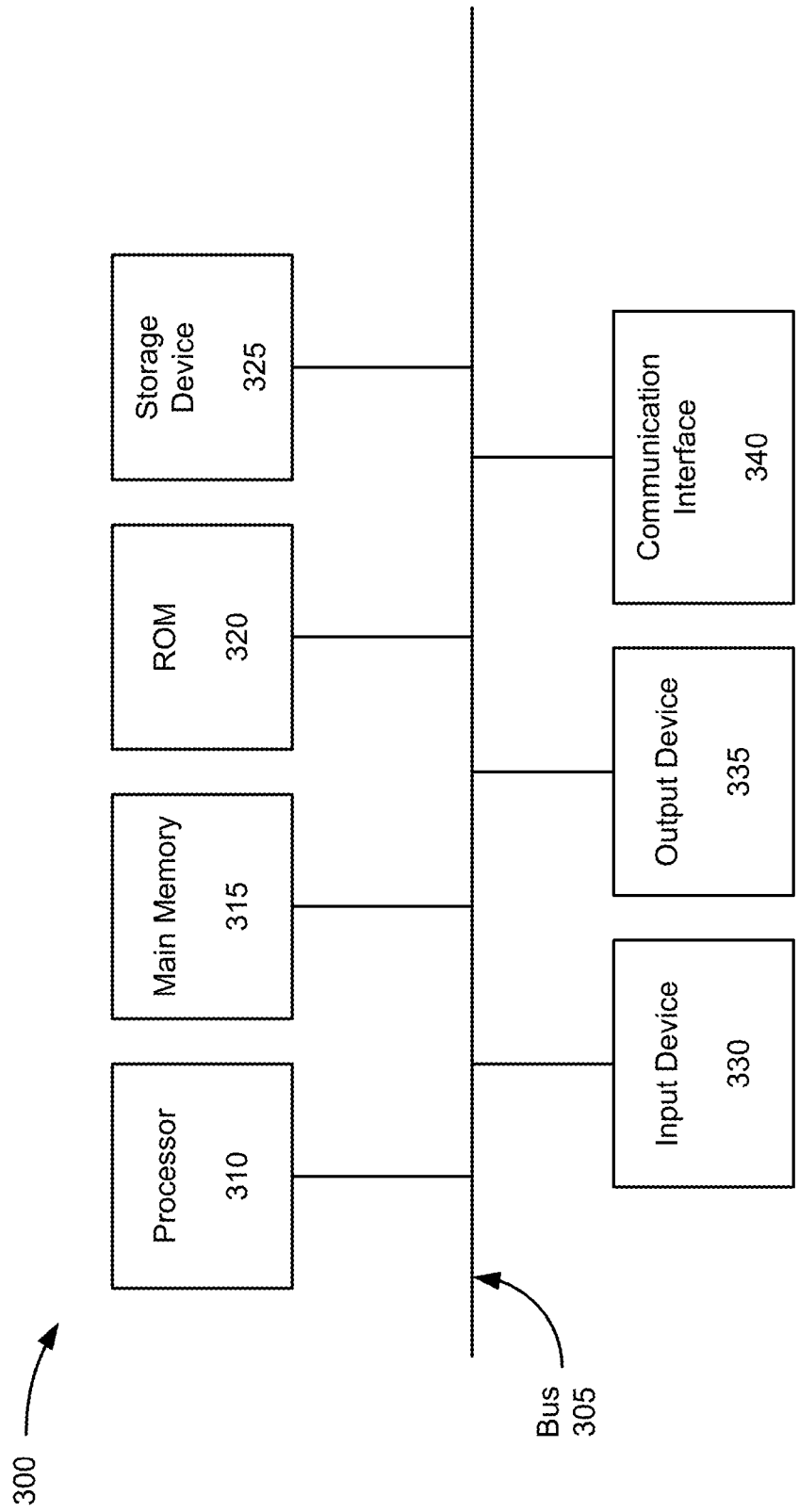
FIG. 3 illustrates example components of a device that may be used within the environment of FIG. 2.

FIG. 3 illustrates example components of a device 300 that may be used within environment 200 of FIG. 2. Device 300 may correspond to user device 210, client device 215, base station 220, SGW 230, MME 240, PGW 250, HSS/AAA server 260, platform server 270, and/or content server 280. Each of user device 210, client device 215, base station 220, SGW 230, MME 240, PGW 250, HSS/AAA server 260, platform server 270, and/or content server 280 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
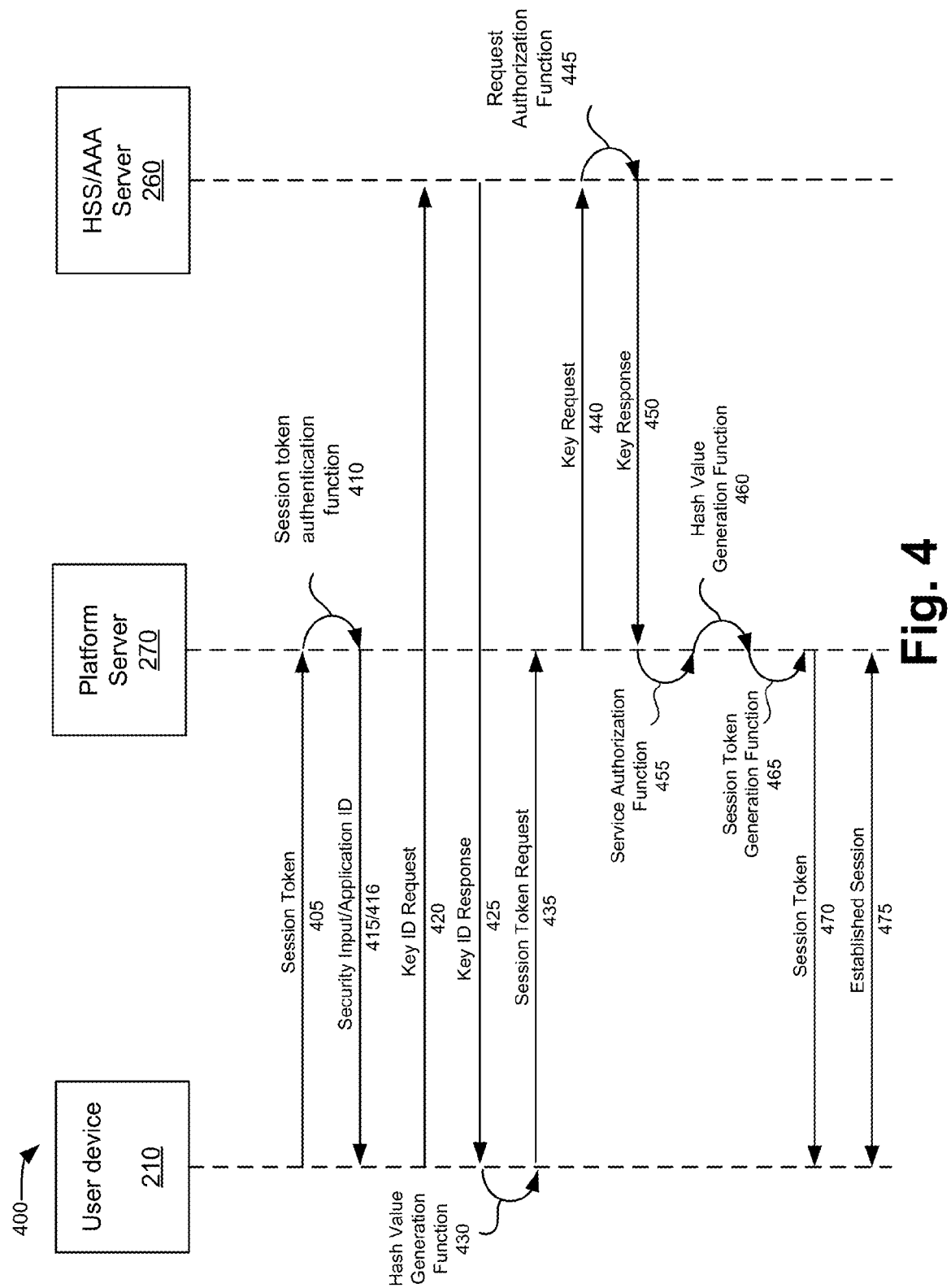
FIG. 4 illustrates a call flow diagram of example operations capable of being performed by an example portion of the environment of FIG. 2.

FIG. 4 illustrates a call flow diagram of example operations capable of being performed by an example portion 400 of environment 200. As shown in FIG. 4, portion 400 may include user device 210, HSS/AAA server 260, and platform server 270. User device 210, HSS/AAA server 260, and/or platform server 270 may include components and/or perform functions described above in connection with, for example, one or more of FIGS. 1-3. FIG. 4 may correspond to example operations to establish a session between user device 210 and platform server 270 to provide user device 210 with access to a content delivery service via platform server 270.

As shown in FIG. 4, user device 210 may provide session token 405 to platform server 270 (e.g., as an input to a session request with platform server 270). In some implementations, session token 405 may include a session identifier, an expiry timestamp, idle expiry time period, an encrypted session key, an encrypted secure storage, and/or a value stored by the secure storage. In some implementations, the value stored by the secure storage may include a value generated based on an input parameter (e.g., a private key associated with platform server 270 and/or some other parameter) and an algorithm (e.g., a hash-based message authentication code (HMAC) algorithm, or some other algorithm). Some examples of a session identifier (ID), an expiry timestamp, idle expiry time period, an encrypted session key, an encrypted secure storage, and a value stored by the secure storage are later described with respect to FIG. 5.

In some implementations, platform server 270 may receive session token 405 and may initiate session token authentication function 410 to authentication session token 405 (e.g., to determine whether session token 405 is authentic and/or valid and to determine whether user device 210 is authorized to communicate with platform server 270). For example, platform server 270 may authenticate session token 405 by determining that session token 405 is unexpired. Additionally, or alternatively, platform server 270 may authenticate session token 405 by calculating a value and determining that the calculated value matches the value stored by the secure storage of session token 405. Additionally, or alternatively, platform server 270 may authenticate session token 405 using some other technique.

In some implementations, platform server 270 may determine whether session token 405 is unexpired by comparing a local time at which session token 405 was received with the expiry timestamp of the session token. Additionally or alternatively, platform server 270 may determine whether session token 405 is expired by comparing a time period in which session token 405 was last received by platform server 270 with the idle expiry time period associated with session token 405. For example, assume that session token 405 was received on 1/1/01 at 13:00:00 and on 1/1/01 at 13:05:00. Platform server 270 may determine a time period of 5 minutes and compare the determined time period with the idle expiry time period and identify whether the determined time period exceeds the idle expiry time period.

Additionally or alternatively, platform server 270 may calculate a value associated with session token 405. For example, platform server 270 may calculate the value based on input parameters (e.g., the session identifier, expiry timestamp, session key, and/or some other parameter) associated with session token 405 and an algorithm. In some implementations, the algorithm used to calculate the value may be based on a cryptographic hash function, an HMAC-MD5, an HMAC-SHA1, and/or some other type of algorithm.

As described above, platform server 270 may compare the calculated value with the value stored by the secure storage associated with session token 405. In some implementations, session token 405 may include a session key (e.g., a random AES 128-bit key and/or some other key) encrypted by a public key, associated with platform server 270. Platform server 270 may decrypt the session key using a private key associated with platform server 270, and may use the decrypted session key to decrypt the secure storage associated with session token 405. Additionally, platform server 270 may identify the value stored by the secure storage, based on decrypting the secure storage. As described above, platform server 270 may compare the calculated value with the value stored by the secure storage, and authenticate session token 405 based on identifying that the calculated value matches the value stored by the secure storage. In some implementations, platform server 270 may authenticate session token 405 using some other technique.

Based on authenticating session token 405, platform server 270 may establish a session with user device 210 to allow user device 210 to access a content delivery service (e.g., to request to receive content, update account information associated with an account of the content delivery service, update subscription information, etc.). Additional details regarding establishing a session are described below with respect to established session 475.

In some situations, platform server 270 may not authenticate session token 405 (e.g., by determining that session token 405 is expired and/or that the calculated value does not match the value stored by the secure storage associated with session token 405). Based on platform server 270 failing to authenticate session token 405, user device 210 may request another session token from platform server 270. In some implementations (e.g., when platform server 270 does not authenticate session token 405), platform server 270 may provide security input 415 and application ID 416 to user device 210. In some implementations, security input 415 may include a nonce value, a randomly generated value, a salt value, and/or some other value. In some implementations, application ID 416 may include an ID of an application associated with the content delivery service (e.g., an application that user device 210 may use to communicate with platform server 270 to access the content delivery service).

In some implementations, user device 210 may receive security input 415 and application ID 416. In some implementations, user device 210 may determine whether user device 210 is storing a key corresponding to the application ID and may determine whether the key is expired. For example, if user device 210 is storing an unexpired key corresponding to the application ID, user device 210 may perform hash value generation function 430 to generate a hash value of security input 415 using the key, as described in greater detail below. If, on the other hand, user device 210 does not store an unexpired key corresponding to the application ID, user device 210 may provide key ID request 420 to HSS/AAA server 260.

In some implementations, key ID request 420 may include application ID 416, an identifier of user device 210 (e.g., a UICCID, and/or some other ID of user device 210), and a request for a key ID (e.g., information that identifies a particular key stored and shared by a UICC of user device 210 and by HSS/AAA server 260). In some implementations, HSS/AAA server 260 may receive key ID request 420 and may select a key ID based on the app ID and the identifier of user device 210. Some examples of selecting a particular key ID based on the app ID and the identifier of user device 210 are described below with respect to FIG. 6.

In some implementations, HSS/AAA server 260 may provide the key ID in key ID response 425 to user device 210. In some implementations, key ID response 425 may include an expiry time period for a key corresponding to the key ID. In some implementations, user device 210 may select the key when the key ID is unexpired. As a result, user device 210 may select the key, corresponding to the key ID, such that the key may not need to be transmitted from HSS/AAA server 260 to user device 210 (e.g., to reduce the possibility of the key being received by an unauthorized device). Some examples of selecting a key corresponding to the key ID are described below with respect to FIG. 6. In some implementations, key ID request 420 and key ID response 425 may correspond to a bootstrapping function performed between user device 210 and HSS/AAA server 260.

In some implementations, user device 210 may perform hash value generation function 430 to generate a hash value of security input 415. For example, user device 210 may generate the hash value using the selected key, corresponding to the key ID, and using a hash generation algorithm. In some implementations, user device 210 may generate the hash value within the time period corresponding to the idle expiry time period in key ID response 425. In some implementations, user device 210 may provide session token request 435 to platform server 270 to request a session token from platform server 270 based on generating the hash value. In some implementations, session token request 435 may include the hash value, an ID of user device 210, and the key ID corresponding to the key used by user device 210 to generate the hash value. Additionally, session token request 435 may include a request to establish a session with platform server 270 (e.g., to access the service via platform server 270), and for a session token that may later be used to request a session with platform server 270.

In some implementations (e.g., based on receiving session token request 435), platform server 270 may look up the key ID in a storage of platform server 270 and may determine whether platform server 270 is storing a key corresponding to the key ID. Further, platform server 270 may determine whether the key is expired or unexpired based on an expiry time period of the key. If platform server 270 is not storing a key corresponding to the key ID or if the key is expired, platform server 270 may provide key request 440 to HSS/AAA server 260. In some implementations, key request 440 may include the key ID included in session token request 435 and a request to receive a key corresponding to the key ID. Additionally, or alternatively, key request 440 may include authorization information that HSS/AAA server 260 may use to authorize platform server 270 to receive the key.

In some implementations, HSS/AAA server 260 may receive key request 440 and may perform request authorization function 445 based on receiving key request 440. For example, HSS/AAA server 260 may use the authorization information, included in key request 440 (e.g., a device ID of platform server 270, a login ID, a password, a time-based token, a private key, or the like), to authorize platform server 270 to receive the key. Additionally, or alternatively, HSS/AAA server 260 may authorize platform server 270 to receive the key based on some other information. For example, HSS/AAA server 260 may authorize platform server 270 based on an IP address via which key request 440 was received, a certificate stored by platform server 270, and/or based on some other information.

In some implementations, HSS/AAA server 260 may provide key response 450 based on authorizing platform server 270 to receive the key. In some implementations, key response 450 may include the key corresponding to the key ID. In some implementations, platform server 270 may store the key for future use such that platform server 270 may not need to request the key from HSS/AAA server 260. In some implementations, key response 450 may further include a key expiry time period that identifies a length of time that the key may be valid when stored by platform server 270. For example, assume that platform server 270 receives the key and stores the key on 1/1/01 at 10:00 and that the key expiry time period is 90 minutes. Further, assume that platform server 270 receives session token request 435 with a key ID, corresponding to the key stored by platform server 270, before 1/1/01 at 11:30. Given these assumptions, platform server 270 may not need to request the key from HSS/AAA server 260 and may not provide key request 440 (e.g., since platform server 270 stores the key corresponding to the key ID and the key is unexpired).

In some implementations, key response 450 may include an IMPI of user device 210 corresponding to the key ID included in key request 440. In some implementations, platform server 270 may perform service authorization function 455 based on receiving key response 450 or based on determining that platform server 270 is storing an unexpired key corresponding to the key ID. In some implementations, platform server 270 may determine whether user device 210 is authorized to access a service (e.g., a content delivery service) based on a UICCID of user device 210, the IMPI of user device 210 included in key response 450, and/or based on some other identifier of user device 210 (e.g., a device ID, a serial number, a telephone number, a subscriber identity module (SIM) card number, and/or some other identifier). For example, platform server 270 may store a list of user device identifiers that are authorized to access the service. In some implementations, platform server 270 may identify the identifier(s) of user device 210 based on information included in session token request 435. In some implementations (e.g., when platform server 270 determines that user device 210 is not authorized to access the service), platform server 270 may provide a response to user device 210 to indicate that user device 210 is not authorized to access the service.

If, on the other hand, platform server 270 determines that user device 210 is authorized to access the service, platform server 270 may perform hash value generation function 460. In some implementations, platform server 270 may generate a hash value of security input 415 using the key corresponding to the key ID and using a particular hash generation algorithm. In some implementations, platform server 270 may select the particular hash generation algorithm based on the key ID and/or based on a format of the key (e.g., based on a quantity of characters in the key, a format of an arrangement of the characters in the key, etc.).

In some implementations, platform server 270 may determine whether the hash value, included in session token request 435, matches the hash value generated by platform server 270. In some implementations, platform server 270 may provide an indication to user device 210 that session token request 435 has been denied when the hash value, included in session token request 435, does not match the hash value generated by platform server 270.

If, on the other hand, the hash value, included in session token request 435, matches the hash value generated by platform server 270, platform server 270 may perform session token generation function 465 to generate session token 470 (e.g., a session token having similar information as session token 405, including an expiration time period). In some implementations, platform server 270 may provide session token 470 to user device 210 and may further establish session 475 based on providing session token 470. In some implementations, platform server 270 may provide session token 470 via a secure channel and may encrypt session token 470 to prevent an unauthorized user from receiving and/or using session token 470.

In some implementations, user device 210 may use session token 470 to request a session with platform server 270 at a later time and prior to an expiration of session token 470.

In some implementations, user device 210 and platform server 270 may communicate via established session 475 such that user device 210 may access the service (e.g., request content, update account information, update subscription information, etc.).

While a particular series of operations and/or data flows have been described above with regard to FIG. 4, the order of the operations and/or data flows may be modified in other implementations. Further, non-dependent operations may be performed in parallel. For example, platform server 270 may perform service authorization function 455 at a different time than described above. For example, platform server 270 may perform service authorization function 455 after receiving session token 405. In the situation where platform server 270 performs service authorization function 455 after receiving session token 405, platform server 270 may perform session token authentication function 410 when user device 210 is authorized to access the service (or provide user device 210 with an indication that user device 210 is not authorized to access the service when platform server 270 determines that user device 210 is not authorized to access the service.

FIG. 5 illustrates an example data structure 500 that may be stored by one or more servers, such as platform server 270. In some implementations, data structure 500 may be stored in a memory of platform server 270. In some implementations, data structure 500 may be stored in a memory separate from, but accessible by platform server 270. A particular instance of data structure 500 may contain different information and/or fields than another instance of data structure 500. In some implementations, each row of data structure 500 may identify information included in a session token. In some implementations, platform server 270 may authenticate a session token, received from user device 210, based on information stored by data structure 500.

As shown in FIG. 5, data structure 500 may include session identifier field 510, expiry timestamp field 520, previous receipt time field 530, idle expiry time period field 540, session key field 550, secure storage key field 560, secure storage value field 570, and partner customer number (PCN) field 580.

Session identifier field 510 may include a string of characters to identify a session token. Session identifier field 510 may store a unique string of characters such that no two strings of characters are alike. Additionally, while the example shown in FIG. 5 shows the session identifier field as four numeric digits (e.g., "1234"), in practice, session identifier field may store any character string including alphanumeric characters, or some other characters, of any length.

Expiry timestamp field 520 may include information identifying a time at which a session token, associated with the corresponding session identifier, will expire (e.g., after which platform server 270 will fail to authenticate the session token). For example, assume that platform server 270 receives a session token associated with the session identifier "1234" on 1/1/01, at 23:05:00. Platform server 270 may identify that the session token is expired since the time of receipt of the session token is after the expiry timestamp associated with the session token.

Previous receipt time field 530 may include information identifying a time at which a session token, associated with the corresponding session identifier, was previously received. For example, assume that platform server 270 received a session token associated with the session identifier "1234" on 1/1/01 at 15:15:00. Previous receipt time field 530 may store 1/1/01, 15:15:00 as the previous receipt time. The information in previous receipt time field 530 may be used to identify whether the session token has expired with respect to an idle expiry time period associated with the session token.

Idle expiry time period 540 may include information identifying a time period in which a session token, associated with the corresponding session identifier, will expire based on inactivity of the session token. For example, as shown in FIG. 5, the idle expiry time period associated with the session token with the session identifier "1234" is 15 minutes. Platform server 270 may identify whether the idle expiry time period has been exceeded based on information associated with previous receipt time field 530 and idle expiry time period field 540. For example, assume that platform server 270 receives the session token associated with session identifier "1234" on 1/1/01 at 15:31:00. Based on information associated with previous receipt time field 530 (e.g., 1/1/01, 15:15:00), platform server 270 may determine a time period (e.g., an idle time period) of 16 minutes (e.g., the time difference between the receipt time of the session token and the time information stored by previous receipt time field 530). Platform server 270 may further identify that the idle time period (i.e., 16 minutes) exceeds the time period stored by idle expiry time period 540 (i.e., 15 minutes). Based on identifying that the idle time period exceeds the time period stored by idle expiry time period 540, platform server 270 may fail to authenticate the session token.

Session key field 550 may include information identifying a session key (e.g., a 128-bit AES key, and/or some other key) stored by a session token, associated with the corresponding session identifier. In some implementations, the session key may be generated based on a private key associated with platform server 270. Additionally, or alternatively, the session key may be generated using some other technique. As shown in FIG. 5, session key field 550 may store the key "89d810e8855ace682d1843d8cb128fe4" associated with the session token with session identifier "1234." As described above, the session key may be used to generate, encrypt, and/or decrypt a secure storage key.

Secure storage key field 560 may include information identifying a secure storage key (e.g., a 128-bit AES key, and/or some other key) stored by a session token associated with the corresponding session identifier. In some implementations, the secure storage key may be generated, encrypted, and/or decrypted by a session key, as described above. As shown in FIG. 5, secure storage key field 560 may store the key "4915598f55e5d7a0daca94fa1f0a63f7" associated with the session token with the session identifier "1234." The secure storage key may be used to secure a digital secure storage (e.g., using a secure digital protocol and/or some other protocol) storing a value (e.g., an HMAC value or some other value).

Secure storage value field 570 may include information identifying a value stored by a secure storage of a session token associated with the corresponding session identifier. As described have, platform server 270 may determine the value based on an HMAC-MD5 algorithm, an HMAC-SHA1 algorithm, and/or some other algorithm with inputs, such as the private key associated with platform server 270 or some other value. Additionally, or alternatively, secure storage value field 570 may include information identifying some other value based on some other hash value generation algorithm and/or technique.

PCN field 580 may include information identifying an account associated with a user of platform server 270 (e.g., an account for a subscriber of a service, such as a content delivery service). In the example shown in FIG. 5, PCN field 580 may store the character string "487516" associated with the session token with session identifier "1234." In some implementations, platform server 270 may identify information for the account associated with the PCN (i.e., "487516") based on receiving and authenticating the session token with the session identifier "1234."

While particular fields are shown in a particular format in data structure 500, in practice, data structure 500 may include additional fields, fewer fields, different fields, or differently arranged fields than are shown in FIG. 5.

FIG. 6 illustrates an example data structure 600 that may be stored by one or more servers, such as HSS/AAA server 260. In some implementations, data structure 600 may be stored in a memory of HSS/AAA server 260. In some implementations, data structure 600 may be stored in a memory separate from, but accessible by HSS/AAA server 260. In some implementations, a portion of data structure 600 may be stored by some other device, such as user device 210 and/or platform server 270. In some implementations, each row of data structure 600 may store a key corresponding to a key ID, an app ID, and a user device ID. A particular instance of data structure 600 may contain different information and/or fields than another instance of data structure 600.

As shown in FIG. 6, data structure 600 may include user device ID field 610, app ID field 620, key ID field 630, key field 640, and expiry time period field 650.

User device ID field 610 may store information identifying a particular user device 210. For example, user device ID field 610 may include an identifier of user device 210, such as a UICCID, an IMPI, a serial number, and/or some other identifier.

App ID field 620 may store information identifying an application that user device 210 may use to access a service via platform server 270. For example, app ID field 620 may store an ID of a video delivery application, an audio delivery application, an account management application, and/or some other application associated with the service. In some implementations, app ID field 620 may include a string of characters having any length and any format.

Key ID field 630 may store an identifier of a key ID that may be used to identify a particular key stored by user device 210 and HSS/AAA server 260 (e.g., a shared key). In some implementations, key ID field 630 may include a string of characters having any length and any format.

Key field 640 may store a key that user device 210 and/or platform server 270 may use to generate a hash value (e.g., a hash value of a security input). In some implementations, key field 640 may store a 128-bit AES key, a private key, and/or some other type of cryptographic key. In some implementations, user device 210 and HSS/AAA server 260 may store the same key corresponding to a particular key ID so that platform server 270 may receive the key from HSS/AAA server 260 and generate the hash value using the same key used by user device 210.

Expiry time period field 650 may identify a time period that a particular key may be stored by user device 210 and/or platform server 270 before the key expires. For example, assume that platform server 270 stores the key at 10:00 and that the key has an expiry period of 5 minutes. Given this assumption, platform server 270 may discard the key at 10:05 or may determine that the key is expired at 10:05. As described above, platform server 270 may request a key from HSS/AAA server 260 by providing a key ID when platform server 270 does not store the key or when platform server 270 stores an expired key.

In some implementations, HSS/AAA server 260 may provide a particular key ID to user device 210 based on a user device ID and an app ID included in key ID request 420. Further, HSS/AAA server 260 may provide a particular key based on a key ID included in key request 440. As an example, assume that HSS/AAA server 260 receives (e.g., as part of key ID request 425) a UICCID of UICC 123 and an IMPI of IMPI 123. Further, assume that HSS/AAA server 260 receives an app ID of A123. Given these assumptions, HSS/AAA server 260 may select Key ID 1, based on information stored by data structure 600, and may provide key ID 1 to user device 210. In some implementations, user device 210 may receive key ID 1 and select key 1 (e.g., the key corresponding to key ID 1). As a result, user device 210 may select key 1 without HSS/AAA server 260 transmitting key 1 to user device 210 (e.g., to reduce the possibility of the key being received by an unauthorized device).

As another example, assume that HSS/AAA server 260 receives (e.g., as part of key request 440) key ID 1 from platform server 270. Further, assume that HSS/AAA server 260 authorizes platform server 270 to receive a corresponding key (e.g., based on performing request authorization function 445). Given these assumptions, HSS/AAA server 260 may select key 1 and may provide key 1 to platform server 270.

While particular fields are shown in a particular format in data structure 600, in practice, data structure 600 may include additional fields, fewer fields, different fields, or differently arranged fields than are shown in FIG. 6.

Figure 7:
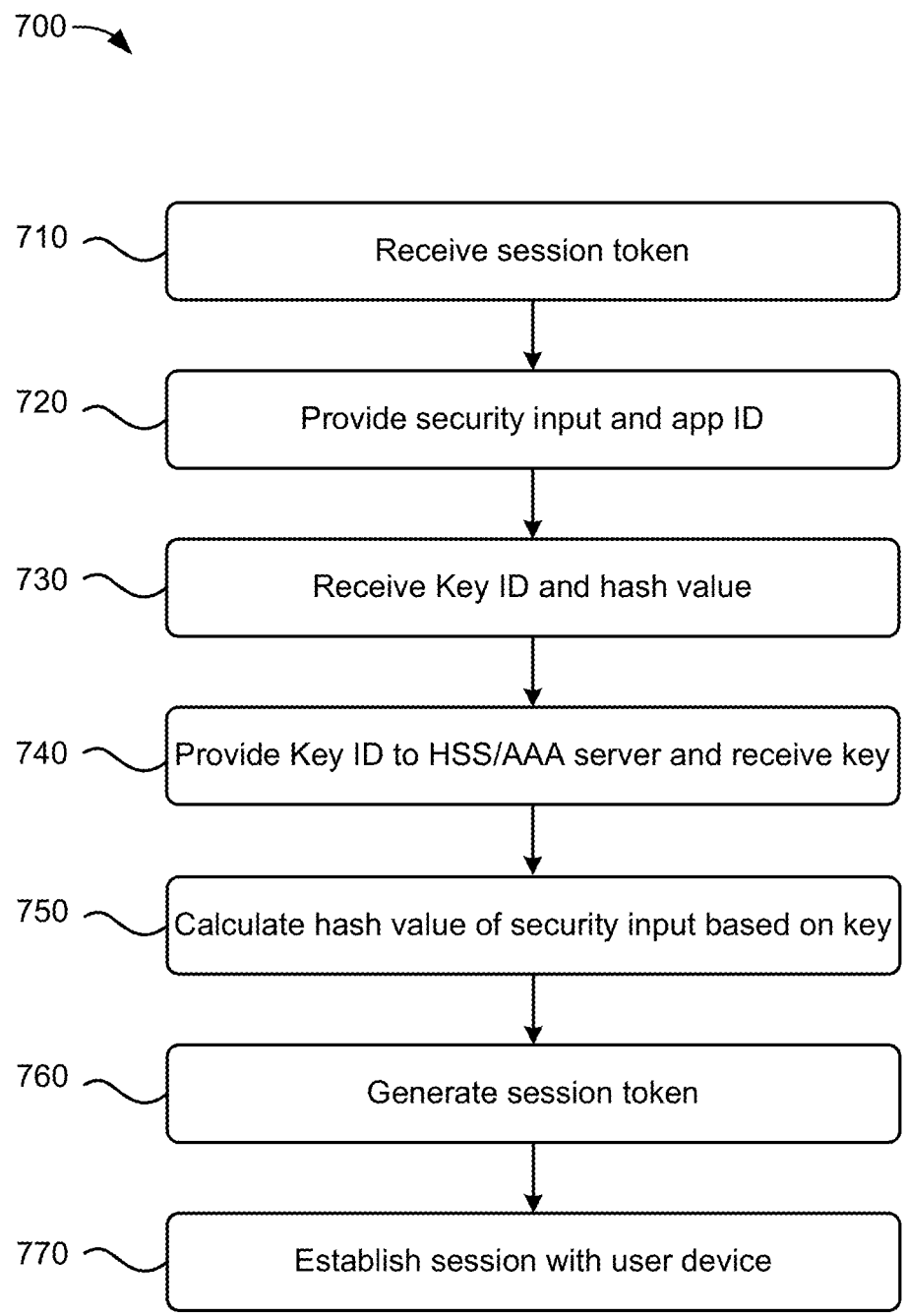
FIG. 7 illustrates a flowchart of an example process for generating a session token and establishing a session with a user device.

FIG. 7 illustrates a flowchart of an example process 700 for generating a session token and establishing a session with a user device. In some implementations, process 700 may be performed by one or more components of platform server 270. In some implementations, some or all of blocks of process 700 may be performed by one or more components of another device in environment 200 (e.g., HSS/AAA server 260), or a group of devices including or excluding platform server 270.

As shown in FIG. 7, process 700 may include receiving a session token (block 710). For example, as described above with respect to session token 405, platform server 270 may receive session token 405 from user device 210 as part of a session request. In some implementations, platform server 270 may perform session token authentication function 410, as described above, to authentication session token 405 (e.g., to determine whether session token 405 is authentic, valid, and/or unexpired, and to determine whether user device 210 is authorized to communicate with platform server 270). In FIG. 7, assume that platform server 270 does not authenticate session token 405 (e.g., when session token 405 is expired and/or when a value, calculated by platform server 270 based on parameters of the session token, does not match a value stored by a secure storage of platform server 270). Given this assumption, user device 210 may request another session token from platform server 270.

Process 700 may also include providing a security input and an application ID (block 720). For example, as described above with respect to security input 415 and app ID 416, platform server 270 may provide security input 415 and app ID 416 to user device 210 when platform server 270 does not authenticate security token 405. In some implementations, user device 210 may provide app ID 416 and an identifier of user device 210 to HSS/AAA server 260 and may receive a key ID corresponding to the app ID and the identifier of user device 210. As described above, user device 210 may select a key corresponding to the key ID and may generate a hash value of security input 415 using the key.

Process 700 may further include receiving a key ID and a hash value (block 730). For example, platform server 270 may receive the key ID and the hash value from user device 210 when user device 210 generates the hash value of security input 415 using the key corresponding to the key ID.

Process 700 may also include providing the key ID to the HSS/AAA server and receiving a key (block 740). For example, as described above with respect to key request 440, platform server 270 may provide the key ID and a request to receive the key corresponding to the key ID. Additionally, or alternatively, platform server 270 may provide authorization information that HSS/AAA server 260 may use to authorize platform server 270 to receive the key (e.g., a device ID of platform server 270, a login ID, a password, a time-based token, a private key, an IP address via which the request to receive the key is provided, or the like). In some implementations, HSS/AAA server 260 may authorize platform server 270 to receive the key based on the authorization information. In some implementations, platform server 270 may receive the key and information identifying an expiry time period (e.g., a time period that identifies a length of time that the key may be valid when stored by platform server 270). In some implementations, platform server 270 may store the key for a length of time corresponding to the expiry time period and may discard the key when the key has expired. In some implementations, block 740 may be omitted when platform server 270 stores the key corresponding to the key ID and when the key is unexpired.

Process 700 may further include calculating a hash value of the security input based on the key (block 750). For example, as described above with respect to hash value generation function 460, platform server 270 may generate a hash value of security input 415 using the key corresponding to the key ID and using a particular hash generation algorithm. In some implementations, platform server 270 may select the particular hash generation algorithm based on the key ID. In some implementations, platform server 270 may determine that the hash value, generated by platform server 270, matches the hash value provided by user device 210.

Process 700 may also include generating a session token (block 760) and establishing a session with the user device (block 770). For example, as described above with respect to session token generation function 465, platform server 270 may generate session token 470 (e.g., a session token having similar information as session token 405, including an expiration time period). In some implementations, platform server 270 may provide session token 470 to user device 210 and may further establish session 475 based on providing session token 470. In some implementations, user device 210 may store session token 470 to request a session with platform server 270 at a later time and prior to an expiration of session token 470. In some implementations, user device 210 and platform server 270 may communicate via established session 475 such that user device 210 may access the service (e.g., request content, update account information, update subscription information, etc.).

While FIG. 7 shows process 700 as including a particular quantity and arrangement of blocks, in some implementations, process 700 may include fewer blocks, additional blocks, or a different arrangement of blocks. Additionally, or alternatively, some of the blocks may be performed in parallel.

Figure 8:
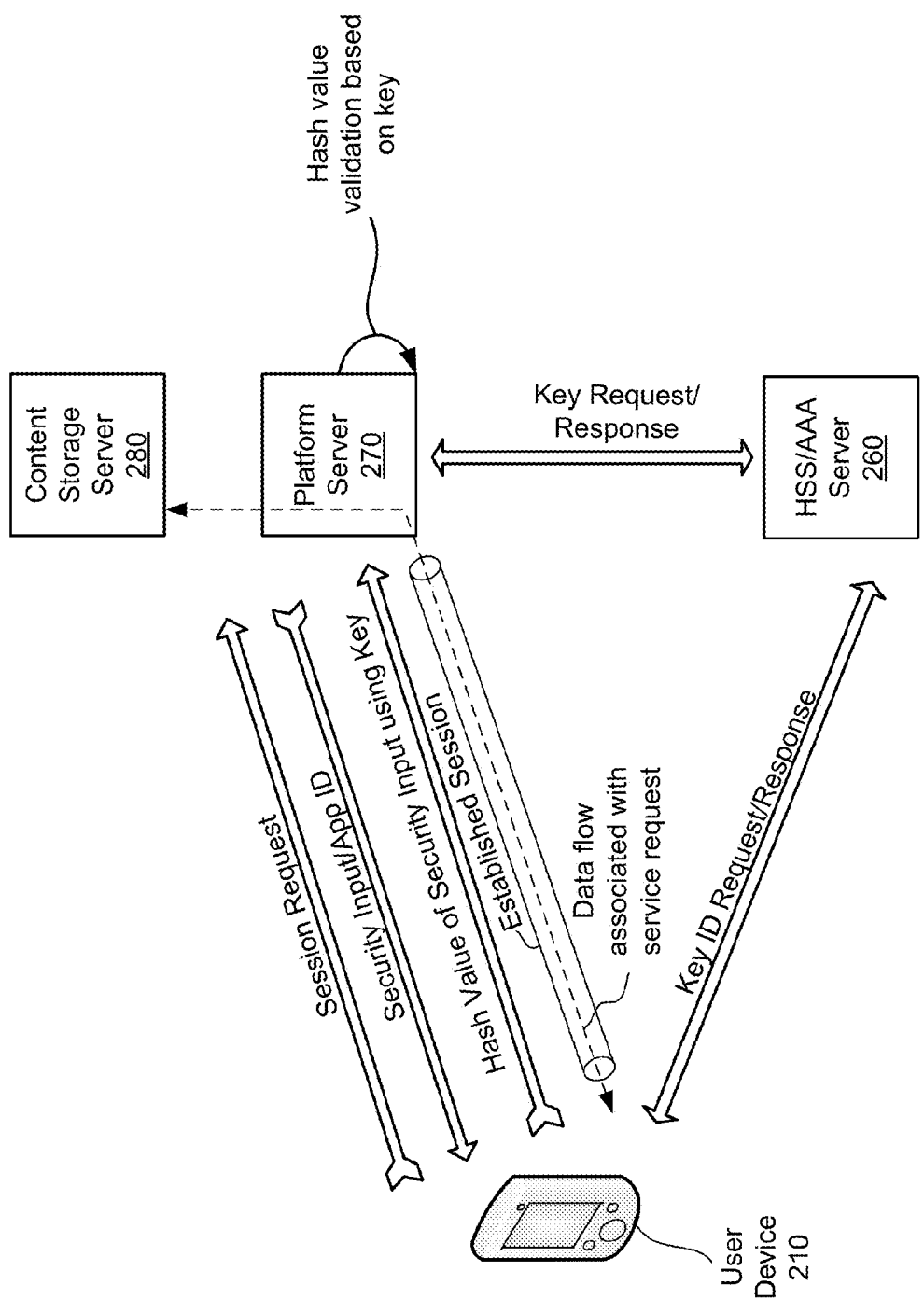
FIG. 8 illustrates an example implementation as described herein.

FIG. 8 illustrates an example implementation as described herein. As shown in FIG. 8, user device 210 may provide a session request to platform server 270. In some implementations, the session request may include a session token. Alternatively, the session request may not include a session token. In FIG. 8, assume that the session request does not include a session token, or that the session request includes an expired and/or invalid session token. Given this assumption, platform server 270 may provide a security input and/or an app ID to user device 210. In some implementations, user device 210 may provide a key ID request to HSS/AAA server 260 to request a key ID corresponding to a device ID of user device 210 and the app ID.

In some implementations, user device 210 may receive the key ID, select a key corresponding to the key ID, generate a hash value of the security input based on the key ID, and provide the hash value of the security input to platform server 270. In some implementations, platform server 270 may receive the hash value and the key ID and may request the key, corresponding to the key ID, from HSS/AAA server 260. In some implementations, HSS/AAA server 260 may provide the key, corresponding to the key ID, based on authorizing platform server 270 to receive the key (e.g., based on authorization information provided by platform server 270). In some implementations, platform server 270 may generate a hash value of the security input using the key and may establish a session when the hash value, generated by platform server 270, matches the hash value provided by user device 210.

In some implementations, platform server 270 may establish a session to transmit a data flow between user device 210 and content server 280 (e.g., in the context of providing user device 210 with content stored by content server 280 as part of a content delivery service). Additionally, or alternatively, user device 210 may communicate with platform server 270 via the established session to perform some other task associated with the content delivery service (update account information, update subscription information, etc.). In some implementations, platform server 270 may provide a session token that user device 210 may later use to request a session with platform server 270.

While a particular example is shown in FIG. 8, it will be apparent that the above description is merely an example implementation. Other examples are possible and may differ from what was described with regard to FIG. 8.

As described above, user device 210 may access service via platform server 270 without providing login information. Further, the content delivery service may remain secure from unauthorized users who may have knowledge of the UICCID of user devices 210 that may be associated with a service subscription. As a result, user experience may be improved by allowing a user to access the service without providing login information, while preventing unauthorized users from accessing the service.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first device, a first session token from a second device;
   determining, by the first device, that the first session token is expired or invalid;
   providing, by the first device and to the second device, a security input and an identifier of an application used by the second device, based on determining that the first session token is expired or invalid,
      the identifier of the application being different than a device identifier of the second device,
      the security input and the identifier of the application causing the second device to:
         provide a key identifier (ID) request to a third device,
         receive, from the third device and based on the key ID request, a key ID response that includes a key corresponding to the key ID, and
         generate a first hash value of the security input using the key corresponding to the key ID;
   receiving, by the first device and from the second device, a session token request that includes the key ID and the first hash value;
   providing, by the first device and to the third device, a key request that includes the key ID;
   receiving, by the first device and from the third device based on the key request, a key response that includes the key corresponding to the key ID;
   generating, by the first device, a second hash value using the key corresponding to the key ID provided in the key response;
   determining, by the first device, that the first hash value matches the second hash value;
   generating, by the first device, a second session token based on determining that the first hash value matches the second hash value;
   providing, by the first device, the second session token to the second device;
   receiving, by the first device and from the second device, a request to establish a session with the first device, the request including the second session token; and
   establishing, by the first device, a session with the second device based on the request and the second session token.

2. The method of claim 1, where the second device stores the second session token.

3. The method of claim 1, further comprising:
   receiving a request for content from the second device via the established session; and
   providing the content to the second device via the established session.

4. The method of claim 1, further comprising:
   receiving an update to account information or subscription information from the second device via the established session; and
   updating the account information or the subscription information.

5. The method of claim 1, where determining that the first session token is expired or invalid is based on an expiry timestamp included in the first session token or based on a value stored by a secure storage included in the first session token.

6. The method of claim 1, further comprising:
   determining that the second device is authorized to communicate with the first device based on the device identifier of the second device,
      where establishing the session is based on determining that the second device is authorized to communicate with the first device.

7. The method of claim 1,
   where the application is used by the second device to communicate with the first device.

8. The method of claim 1, further comprising:
   notifying the second device that the session cannot be established based on determining that the first hash value does not match the second hash value.

9. A system comprising:
   a first device to:
      receive a first session token from a second device;
      determine that the first session token is expired or invalid;
      provide, to the second device, a security input and an identifier of an application used by the second device, based on determining that the first session token is expired or invalid,
         the identifier of the application being different than a device identifier of the second device,
      the security input and the identifier of the application causing the second device to:
         provide a key identifier (ID) request to a third device,
         receive, from the third device and based on the key ID request, a key ID response that includes a key corresponding to the key ID, and
         generate a first hash value of the security input using the key corresponding to the key ID;
      receive, from the second device, a session token request that includes the key ID and the first hash value;
      provide, to the third device, a key request that includes the key ID;
      receive, from the third device and based on the key request, a key response that includes the key corresponding to the key ID;
      generate a second hash value using the key corresponding to the key ID provided in the key response;
      determine that the first hash value matches the second hash value;
      generate a second session token based on determining that the first hash value matches the second hash value;
      provide the second session token to the second device;

receive, from the second device, a request to establish a session with the first device,
the request including the second session token; and
establish a session with the second device based on the request and the second session token.

10. The system of claim 9, where the second device stores the second session token.

11. The system of claim 9, where the first device is further to:
receive an update to account information or subscription information from the second device via the established session; and
update the account information or the subscription information.

12. The system of claim 9, where, when determining that the first session token is expired or invalid, the first device is to:
determine that the first session token is expired or invalid based on an expiry timestamp included in the first session token or based on a value stored by a secure storage included in the first session token.

13. The system of claim 9, where the first device is further to:
determine that the second device is authorized to communicate with the first device based on the device identifier of the second device,
where, when providing the security input and the identifier of the application to the second device, the first device is to provide the security input and the identifier of the application to the second device based on determining that the second device is authorized to communicate with the first device.

14. The system of claim 9, where the application is used by the second device to communicate with the first device.

15. The system of claim 9, where the first device is further to:
notify the second device that the session cannot be established based on determining that the first hash value does not match the second hash value.

16. A non-transitory computer-readable medium for storing instructions, the instructions comprising:
a plurality of instructions which, when executed by one or more processors associated with a first device, cause the one or more processors to:
receive a first session token from a second device;
determine that the first session token is expired or invalid;
provide, to the second device, a security input and an identifier of an application used by the second device, based on determining that the first session token is expired or invalid,
the identifier of the application being different than a device identifier of the second device,
the security input and the identifier of the application causing the second device to:
provide a key identifier (ID) request to a third device,
receive, from the third device and based on the key ID request, a key ID response that includes a key corresponding to the key ID, and
generate a first hash value of the security input using the key corresponding to the key ID;
receive, from the second device, a session token request that includes the key ID and the first hash value;
provide, to the third device, a key request that includes the key ID;
receive, from the third device and based on the key request, a key response that includes the key corresponding to the key ID;
generate a second hash value using the key corresponding to the key ID provided in the key response;
determine whether the first hash value matches the second hash value;
generate a second session token based on determining that the first hash value matches the second hash value;
provide the second session token to the second device;
receive, from the second device, a request to establish a session with the first device,
the request including the second session token; and
establish a session with the second device based on the request and the second session token.

17. The non-transitory computer-readable medium of claim 16, where the plurality of instructions further cause the one or more processors to:
notify the second device that the session cannot be established based on determining that the first hash value does not match the second hash value.

18. The non-transitory computer-readable medium of claim 16, where the plurality of instructions, that cause the one or more processors to determine that the first session token is expired or invalid, cause the one or more processors to:
determine that the first session token is expired or invalid based on an expiry timestamp included in the first session token or based on a value stored by a secure storage included in the first session token.

19. The non-transitory computer-readable medium of claim 16, where the application is used by the second device to communicate with the first device.

20. The non-transitory computer-readable medium of claim 16, where the plurality of instructions further cause the one or more processors to:
receive an update to account information or subscription information from the second device via the established session; and
update the account information or the subscription information.

* * * * *